2,747,004

MOLYBDENUM OXIDE-SILICA-ALUMINA ISOMERIZATION BY PURIFICATION OF HYDROGEN FEED

Norman C. Carter, Bartlesville, Okla., and John S. Cromeans, Louisville, Ky., assignors to Phillips Petroleum Company, a corporation of Delaware No Drawing. Application October 1, 1951, Serial No. 249,228

9 Claims. (Cl. 260—683.5)

This invention relates to a process for the isomerization of a paraffin hydrocarbon over a catalyst of molybdenum oxide-silica-alumina in the presence of hydrogen. In one of its aspects the invention relates to the provision of an improved isomerization process feed or charge. In another aspect the invention relates to the provision of an improved hydrogen feed resulting in considerably improved isomerization and yields as appears herein. In still another aspect the invention relates to the pretreatment of the charge stock, for example, hydrogen gas used in the process, to remove therefrom impurities which now have been found to cause lowered yields and inferior operation in the isomerization of hydrocarbons employing a molybdenum oxide-silica-alumina catalyst.

Catalysts of the molybdenum oxide-silica-alumina type have been found highly effective in the isomerization of paraffinic hydrocarbons at temperatures of 700° to 1000° F., pressures of 150 to 1000 pounds per square inch, liquid hourly space velocities of 0.5 to 2.5, preferably 0.8 to 1.6, and mol ratios of hydrogen to hydrocarbon of 0.1:1.0 to 2.0:1.0, preferably 0.3:1.0 to 0.8:1.0. In the isomerization reaction over molybdenum oxide-silica-alumina catalyst, it has been found necessary to add hydrogen to the feed gas in order to obtain satisfactory isomerization. The function of the hydrogen appears to be primarily to suppress the formation of carbonaceous material on the catalyst and thereby maintain the activity and selectivity of the catalyst for a longer period of time. However, an additional function of the hydrogen appears to be to reduce the proportion of olefins and aromatics to be found in the product.

Hydrogen is available in a refinery from several sources. For instance, hydrogen may be recovered either from cracking still gases by separation from the gaseous hydrocarbons resulting from the pyrolysis of long-chain hydrocarbons or from the effluent gases of a dehydrogenation process. The hydrogen recovered from these processes, as well as the hydrogen manufactured from iron and steam, hydrocarbons and steam, coke oven gas, and water gas, usually contains varying amounts of carbon monoxide and carbon dioxide as impurities, even after the usual purification steps for commercial hydrogen.

We have now discovered that improved results can be obtained in the isomerization of paraffinic hydrocarbons with molybdenum oxide-silica-alumina catalyst in the presence of an atmosphere of hydrogen provided the hydrogen used in the process is first treated to remove carbon dioxide and carbon monoxide impurities therefrom. Thus, we have found that sometimes the presence of as little as 0.1 to 0.2 mol per cent of carbon dioxide and/or carbon monoxide in the hydrogen feed stream can be detrimental to the conversion of hydrocarbon obtained. For example, the presence of two per cent carbon dioxide in a hydrogen feed gas reduced the isomerization of normal pentane from a conversion of approximately 40 weight per cent to 25 weight per cent. The effect of a similar concentration of carbon monoxide in the hydrogen feed is equally severe.

Various processes are available in the prior art for the removal of carbon dioxide and carbon monoxide from hydrogen gases. The general processes used in the usual purification of commercial hydrogen may be applicable in the practice of my invention if additional control is exercised to secure more complete removal of the impurities. Methods for the removal of carbon dioxide may possibly include scrubbing the hydrogen stream with water under pressure, washing the hydrogen stream with a caustic wash, absorbing the carbon dioxide in a solution of monoethanolamine, passing the hydrogen stream through a purifier containing moist hydrated lime, or other methods known to those skilled in the art. The removal of carbon monoxide may be accomplished by washing the hydrogen stream with an ammoniacal solution of a cuprous salt at high pressures, but a more suitable method for the pretreatment of an isomerization feed stream is probably the catalytic conversion of the carbon monoxide to carbon dioxide for subsequent removal with the original carbon dioxide impurity. The oxidation of carbon monoxide may be readily accomplished by addition of oxygen or air to the hydrogen stream and passage of the mixture over a catalyst of dehydrated Hopcalite, which is essentially a mixture of manganese dioxide and cupric oxide with minor amounts of cobalt and silver oxides, at temperatures between 50° and 200° F. and pressures between 300 and 750 pounds per square inch.

Although the method of operation used to accomplish the purpose of our invention is not an important feature of our invention, a desirable method of operation appears to be treatment of the hydrogen stream with Hopcalite to effect the oxidation of carbon monoxide to carbon dioxide and removal of the carbon dioxide originally in the hydrogen stream and that formed from conversion of the carbon monoxide by scrubbing with water at a pressure of from 300 to 500 pounds per square inch before passing the hydrogen to the isomerization zone. Some of the other methods previously mentioned may be substituted for the suggested processes, but if conventional caustic washing is to be used in place of the water scrubbing step, precautions will have to be taken to prevent the carry over of caustic on the catalyst because it is known that caustic is damaging to the activity of this catalyst.

The following data in Table I are given to show the detrimental effect of carbon monoxide and carbon dioxide in the hydrogen feed stream on the conversion of normal pentane to isopentane by coprecipitated molybdenum oxide-silica-alumina catalyst of 20 per cent molybdenum oxide, 5 per cent silica and 75 per cent alumina by weight. In runs 1 and 2, the presence of 2.6 mol per cent carbon dioxide is found to reduce the conversion of pentane from 40.2 to 24.9 per cent by weight. Runs 3 and 4 show a reduction of pentane conversion from 39.2 to 28.6 with 2.5 per cent by weight of carbon monoxide in the hydrogen stream. Run 5 shows the negligible effect of dilution of the hydrogen feed with hydrocarbons. The data in Table II show the detrimental effect of carbon dioxide in the hydrogen feed stream on the isomerization of a feed material of mixed commercial pentane and commercial hexane over the same molybdenum oxide-silica-alumina catalyst. In runs 1 and 2, the presence of 1.9 mol per cent carbon dioxide is found to reduce the conversion of pentane from 37.9 to 24.3 per cent by weight and hexane from 32.8 to 27.0 per cent by weight.

TABLE I

*Isomerization of normal pentane by coprecipitated molybdenum oxide-silica-alumina with methane, propylene, carbon dioxide and carbon monoxide impurities in the hydrogen feed gas*

|  | Run 1 | Run 2 | Run 3 | Run 4 | Run 5 |
|---|---|---|---|---|---|
| Feed Gas, Mol Percent: |  |  |  |  |  |
| $H_2$ | 57.6 | 58.5 | 58.6 | 56.3 | 100.0 |
| $CH_4$ | 39.0 | 38.6 | 41.3 | 40.6 |  |
| $C_2H_6$ | 0.3 | 0.3 | 0.3 | 0.6 |  |
| $C_3H_6$ | 2.9 | 0.0 | 0.0 | 0.0 |  |
| CO | 0.0 | 0.0 | 0.0 | 2.5 |  |
| $CO_2$ | 0.0 | 2.6 | 0.0 | 0.0 |  |
| Pressure, p. s. i. | 515 | 515 | 515 | 515 | 515 |
| Hydrogen/hydrocarbon, mol ratio | 0.44 | 0.46 | 0.4 | 0.4 | 0.8 |
| Residual Time, Sec | 111 | 108 | 107 | 112 | 111 |
| Space Velocity, lv./v./hr | 1.3 | 1.3 | 1.4 | 1.3 | 1.33 |
| Temperature, °F | 820 | 820 | 820 | 820 | 820 |
| On-Stream Period, Hr | 0.25–4.25 | 0.25–4.25 | 0.25–4.25 | 0.25–4.25 | 0.25–4.25 |
| Times catalyst revivified | 9 | 8 | 3 | 4 | 0 |
| Effluent Composition, Wt. Percent: |  |  |  |  |  |
| $C_1$ | 0.7 | 1.1 | 0.1 | 0.7 | 0.1 |
| $C_2$ | 0.5 | 0.2 | 0.6 | 0.2 | 0.3 |
| $C_3$ | 0.9 | 0.5 | 0.7 | 0.9 | 0.6 |
| $C_4$ | 1.5 | 0.8 | 1.4 | 1.1 | 0.8 |
| $i-C_5$ | 36.6 | 22.3 | 34.7 | 23.4 | 36.4 |
| $n-C_5$ | 59.8 | 75.1 | 60.8 | 71.4 | 59.0 |
| Neohexane |  |  | 0.7 | 0.2 | 0.9 |
| Cyclo-$C_5$ |  |  | 1.0 | 2.1 | 1.9 |
| Carbon, wt. percent of Catalyst | 0.8 | 0.3 | 0.6 | 0.5 | 0.04 |
| Carbon, wt. percent of Feed | 0.3 | 0.1 | 0.2 | 0.2 | 0.014 |
| Conversion of $n-C_5$, wt. percent | 40.2 | 24.9 | 39.2 | 28.6 | 41.0 |
| Yield of $C_5+$ per Pass, wt. percent | 96.1 | 97.3 | 92.8 | 89.9 | 98.2 |
| Ultimate yield of $i-C_5$, wt. percent | 91.0 | 89.6 | 92.8 | 89.9 | 95.6 |

TABLE II

*Isomerization of mixed commercial pentane and commercial hexane by coprecipitated molybdenum oxide-silica-alumina catalyst with methane, propylene, and carbon dioxide impurities in the hydrogen feed gas*

|  | Run 1 | Run 2 | Run 3 |
|---|---|---|---|
| Feed Gas, Mol Percent: |  |  |  |
| $H_2$ | 60.8 | 60.8 | 100 |
| $CH_4$ | 35.7 | 35.7 |  |
| $C_2H_6$ | 0.2 | 0.2 |  |
| $C_3H_6$ | 1.4 | 1.4 |  |
| $CO_2$ | 1.9 | 1.9 |  |
| Pressure, p. s. i. | 515 | 515 | 515 |
| Hydrogen/Hydrocarbon (Mol) | 0.39 | 0.39 | 0.70 |
| Residance Time, Sec |  |  |  |
| Space Velocity, lv./v./hr | 1.4 | 1.3 | 1.4 |
| Temperature: |  |  |  |
| °F | 840 | 860 | 860 |
| °C | 449 | 460 | 460 |
| On-Stream Period, Hr | 0.25–4.0 | 0.25–4.25 | 0.45–3.0 |
| Times Catalyst Revivified | 0 | 1 | 3 |
| Effluent Composition, Wt. Percent: |  |  |  |
| $C_1$ | 4.3 | 4.6 | 0.5 |
| $C_2$ | 0.3 | 0.6 | 0.6 |
| $C_3$ | 1.9 | 2.2 | 2.1 |
| $C_4$ | 1.1 | 1.7 | 1.7 |
| $i-C_5$ | 12.0 | 13.8 | 20.7 |
| $n-C_5$ | 37.6 | 36.8 | 30.2 |
| Cyclo-$C_5$ | 1.3 | 2.1 | 1.3 |
| Neohexane | 0.5 | 0.9 | 1.1 |
| DIP | 0.1 | 0.6 | 1.7 |
| MCP | 3.5 | 3.7 | 4.2 |
| 3 MP | 5.1 | 5.2 | 6.6 |
| Cyclohexane | 4.3 | 0.2 | 0.4 |
| 2 MP | 4.4 | 4.4 | 7.7 |
| $n-C_6$ | 20.9 | 20.0 | 18.4 |
| Aromatics | 2.7 | 3.2 | 2.8 |
| $H_2$ Produced/Bbl. of Feed, Cu. ft | 23 | 72 | 122 |
| Carbon: |  |  |  |
| Wt. Percent of Catalyst | 0.8 | 1.0 | 1.7 |
| Wt. Percent of Feed | 0.3 | 0.4 | 0.8 |
| Yield of $C_5+$ per Pass, wt. percent | 92.1 | 90.5 | 94.3 |
| Conversion of $n-C_5$ and $n-C_6$, wt. percent | 23.0 | 25.3 | 36.0 |
| $n-C_5$ | 22.6 | 24.3 | 37.9 |
| $n-C_6$ | 23.7 | 27.0 | 32.8 |

Reasonable variation and modification are possible within the scope of the foregoing disclosure and appended claims to the invention the essence of which is that removal of CO and $CO_2$ (carbon oxides) from the charge to an isomerization operation, wherein a paraffin hydrocarbon, for example butane, pentane or hexane, or the like, is isomerized, or further isomerized, especially from the hydrogen used therein, has been found to materially increase the yield of desired isomers.

We claim:

1. The isomerization of a paraffin hydrocarbon in the presence of an isomerization catalyst and hydrogen which comprises removing substantially all of the carbon oxide content of the hydrogen in the charge to said catalyst before effecting said isomerization and then effecting said isomerization.

2. In the conversion to isomeric forms thereof of a normal paraffin hydrocarbon at elevated temperature in the presence of a catalyst and hydrogen the step of treating the hydrogen to remove substantially all of its carbon oxide content prior to the contact of the hydrocarbon with the catalyst to effect said conversion and then subjecting said paraffin hydrocarbon to said conversion.

3. The isomerization of a paraffin hydrocarbon with a molybdenum oxide-silica-alumina catalyst in the presence of an atmosphere of hydrogen, which comprises pretreating the said hydrogen to remove substantially all of its carbon oxide content prior to the contact of the hydrocarbon with the catalyst to effect said isomerization and then subjecting said hydrocarbon to said catalyst to effect the said isomerization.

4. In the isomerization of a low-boiling paraffinic hydrocarbon at a temperature in the range 700° to 1000° F., a pressure of 150 to 1000 pounds per square inch, a liquid hourly space velocity of 0.5 to 2.5 and in the presence of a quantity of hydrogen providing a molar ratio of hydrogen to hydrocarbon of 0.1:1.0 to 2.0:1.0 in the presence of a molybdenum oxide-silica-alumina type catalyst, the step of removing substantially all of the carbon oxide content of the hydrogen in the feed to the isomerization catalyst.

5. A process according to claim 4 wherein the carbon oxide content is removed by washing the hydrogen stream with an agent selected from the group consisting of a caustic wash, a solution of monoethanolamine, moist hydrated lime and an ammonia solution of a cuprous salt at high pressure.

6. A process according to claim 4 wherein any carbon monoxide in the said hydrogen is first converted to carbon dioxide by catalytic oxidation and then substantially all of the carbon dioxide is removed by contact with an agent selected from the group consisting of a caustic wash, a solution of monoethanolamine and moist hydrated lime.

7. In the isomerization of a low-boiling paraffinic hydrocarbon at a temperature in the range 700° to 1000° F., a pressure of 150 to 1000 pounds per square inch, a liquid hourly space velocity of 0.5 to 2.5 and in the presence of a quantity of hydrogen providing a molar ratio of hydrogen to hydrocarbon of 0.1:1.0 to 2.0:1.0 in the presence of a molybdenum oxide-silica-alumina type catalyst, the step of removing substantially all of the carbon oxide content of the feed to the isomerization catalyst by pretreating the hydrogen before it is admixed with said paraffinic hydrocarbon with a catalyst consisting essentially of a dehydrated mixture of manganese dioxide and cupric oxide with minor amounts of cobalt and silver oxides at temperatures between 50° and 200° F. and at pressures between 300 and 750 pounds per square inch.

8. A process according to claim 4 wherein the hydrocarbon isomerized is pentane.

9. A process according to claim 4 wherein the hydrocarbon isomerized is hexane.

References Cited in the file of this patent

UNITED STATES PATENTS

| | | |
|---|---|---|
| 2,433,482 | Roberts | Dec. 30, 1947 |
| 2,443,608 | Evering et al. | June 22, 1948 |
| 2,468,549 | Evering et al. | Apr. 26, 1949 |
| 2,562,989 | Naragon | Aug. 7, 1951 |